United States Patent [19]

Birdwell

[11] 4,061,231

[45] Dec. 6, 1977

[54] PIPE HANDLING APPARATUS FOR PIPE LAYING BARGES

[75] Inventor: J. C. Birdwell, Houston, Tex.

[73] Assignee: Midcon Pipeline Equipment Co., Houston, Tex.

[21] Appl. No.: 694,890

[22] Filed: June 10, 1976

Related U.S. Application Data

[62] Division of Ser. No. 592,170, July 1, 1975, Pat. No. 3,984,007.

[51] Int. Cl.² .............................................. B65G 25/02
[52] U.S. Cl. .................................. 214/1 P; 198/774; 214/1 BD
[58] Field of Search .............................. 198/487–490, 198/774; 214/1 P, 1 PA, 1 PB, 8.5 A, 1 BD, 146.5, 148, DIG. 10, DIG. 4, 12, 13, 15 R

[56] References Cited

U.S. PATENT DOCUMENTS

| | | | |
|---|---|---|---|
| 2,914,170 | 11/1959 | Kent | 198/489 X |
| 3,225,397 | 12/1965 | Grunewald et al. | 214/146.5 |
| 3,530,970 | 9/1970 | Richardson et al. | 198/489 X |
| 3,894,637 | 7/1975 | Bickham | 214/1 P |

FOREIGN PATENT DOCUMENTS 1,604,142  8/1971  France ................................ 198/774

*Primary Examiner*—Frank E. Werner
*Attorney, Agent, or Firm*—Carl B. Fox, Jr.

[57] ABSTRACT

Pipe handling apparatus for pipe laying barges, sometime called lay barges, wherein pipe is lifted from an incoming pipe conveyor to a transverse rack, from one rack position to another, and from the rack to the pipe line-up conveyors, by a series of pivotal lifting means which lift, move, and deposit the pipe without impact or shock, whereby the pipe and any concrete or other coating on the pipe is not damaged. In addition to the novel pipe transferring means, the invention presents a novel universally adjustable line-up conveyor apparatus.

6 Claims, 14 Drawing Figures

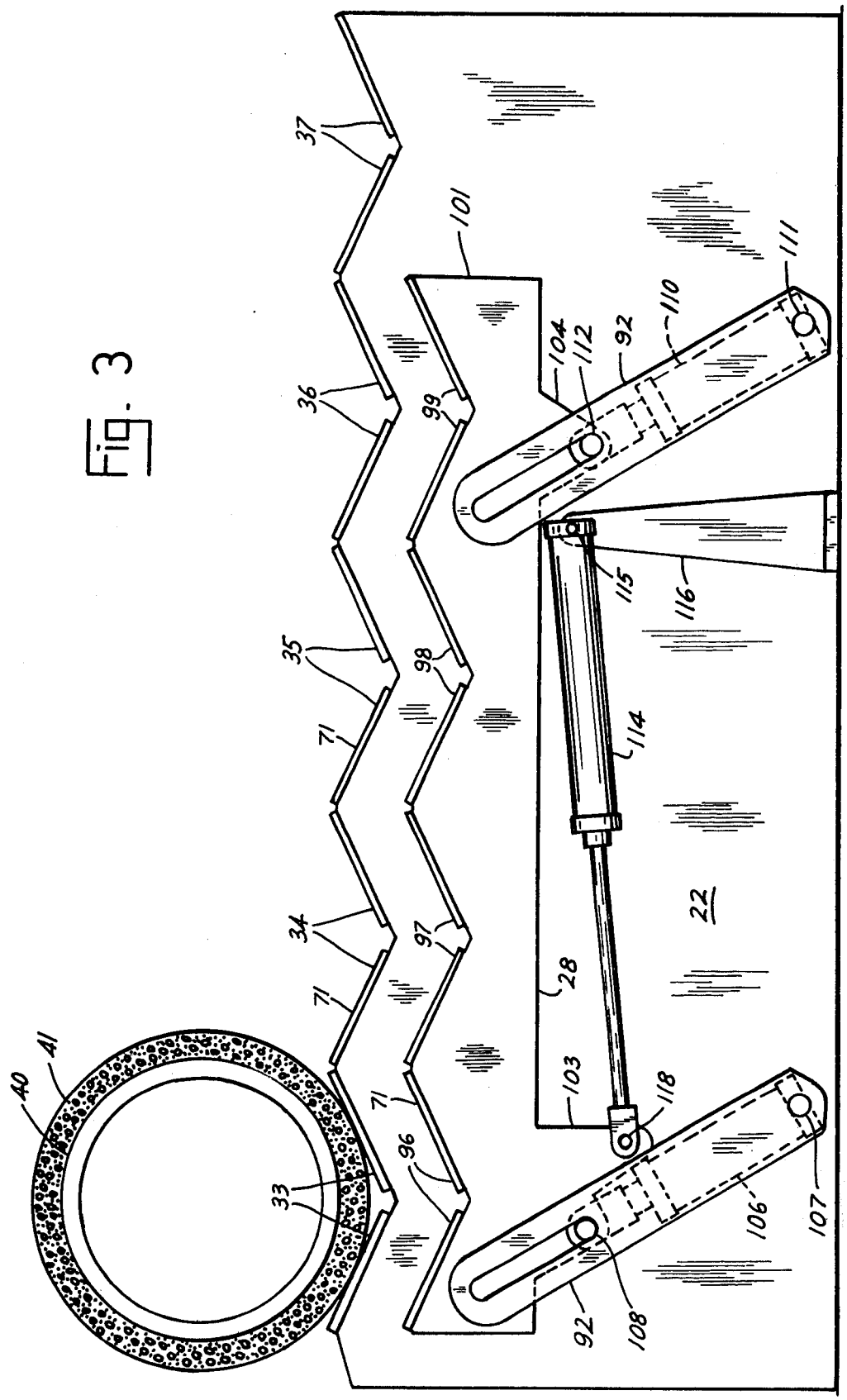

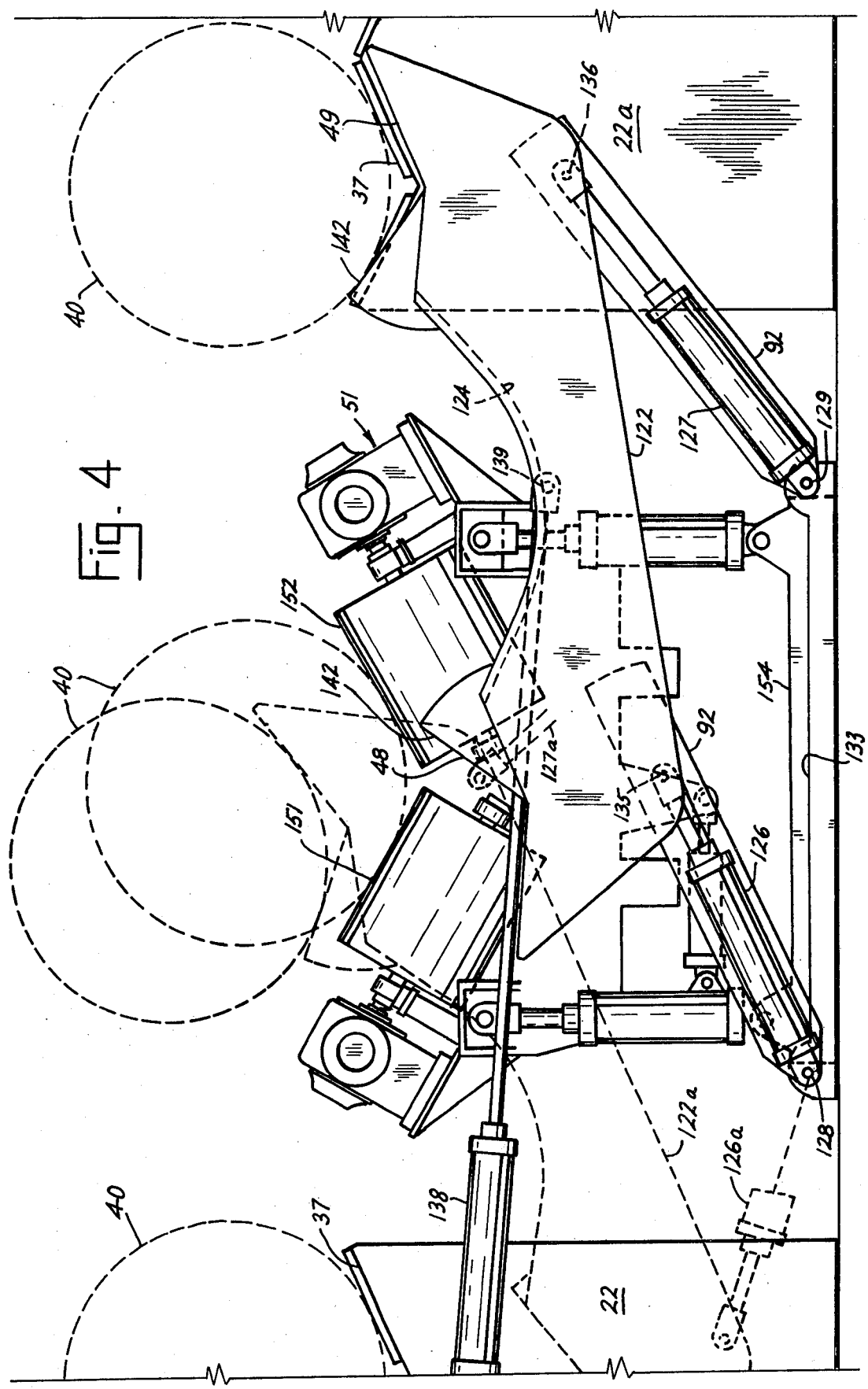

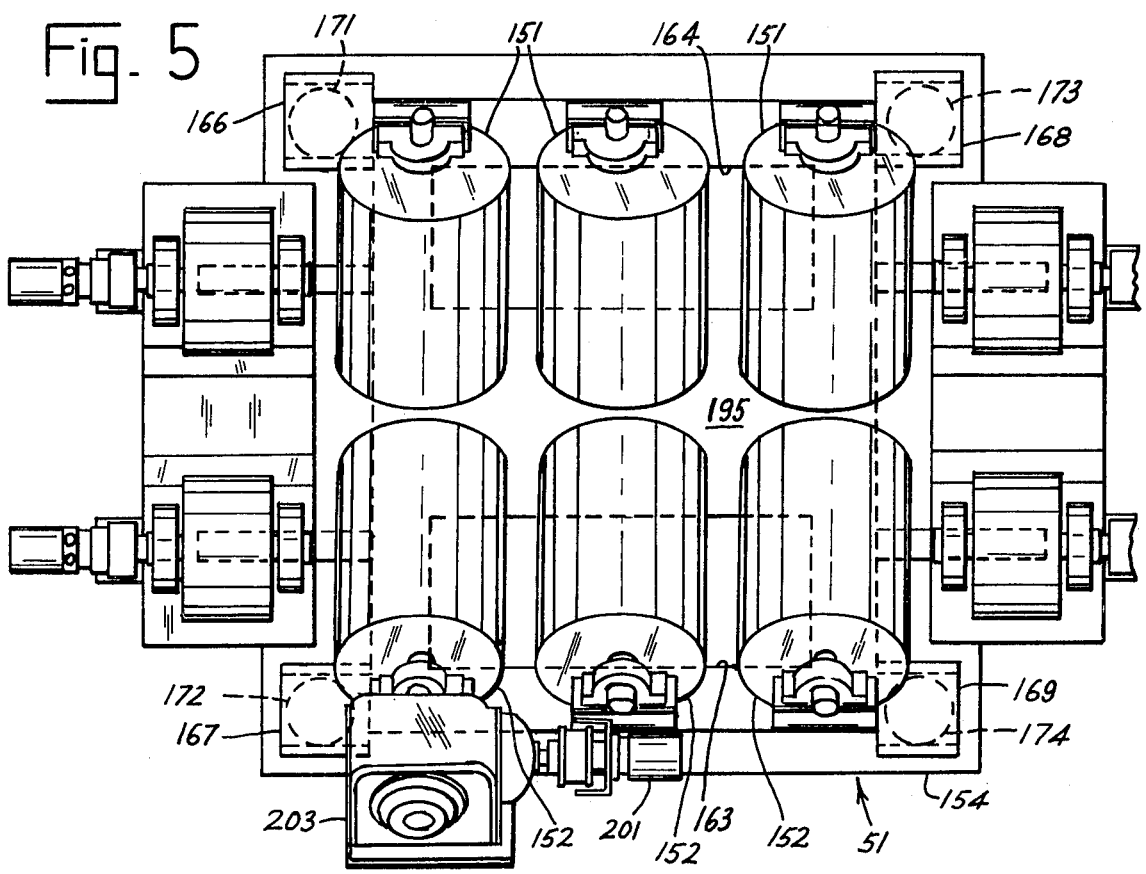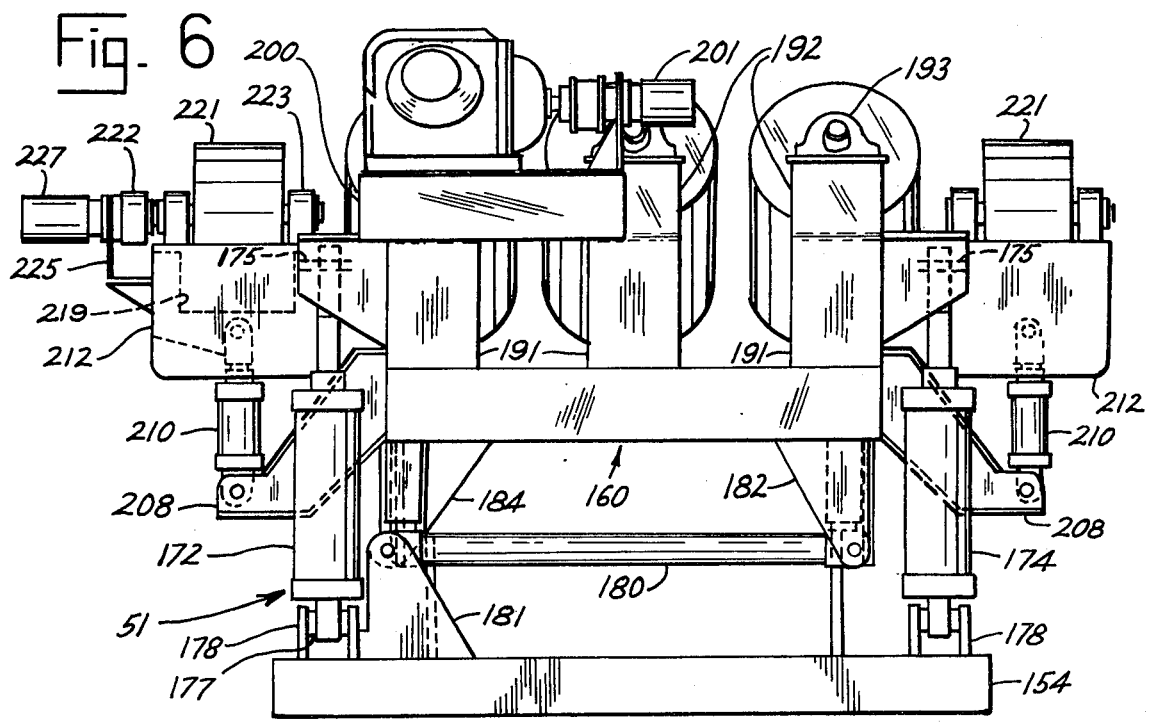

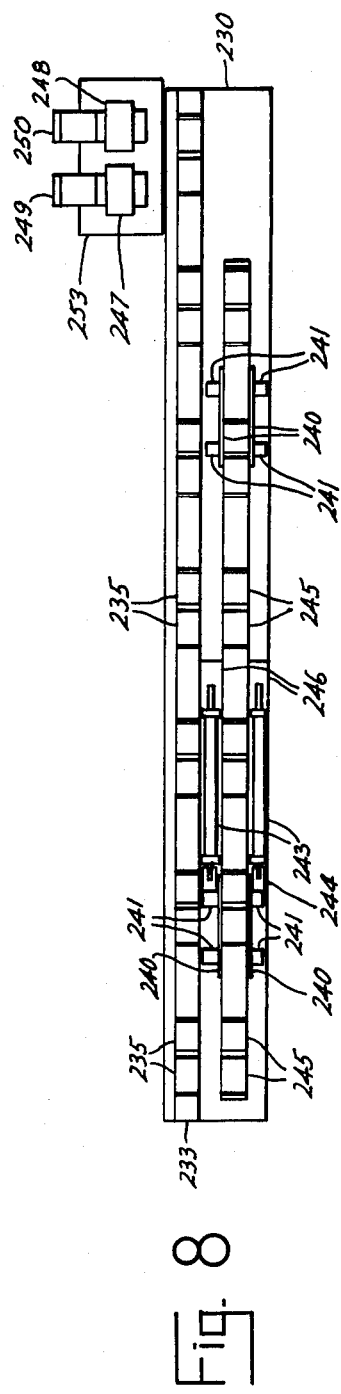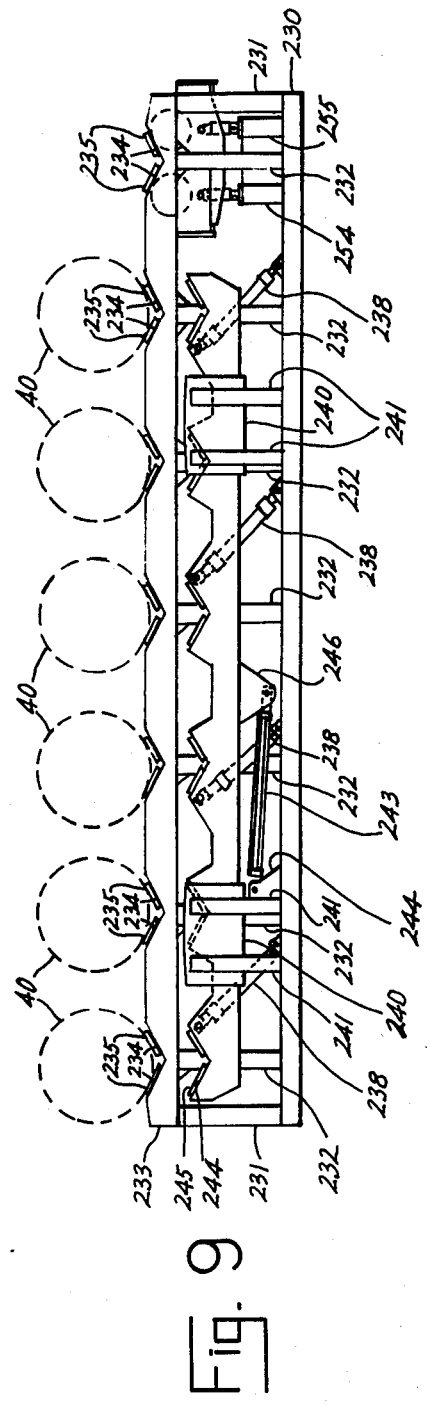

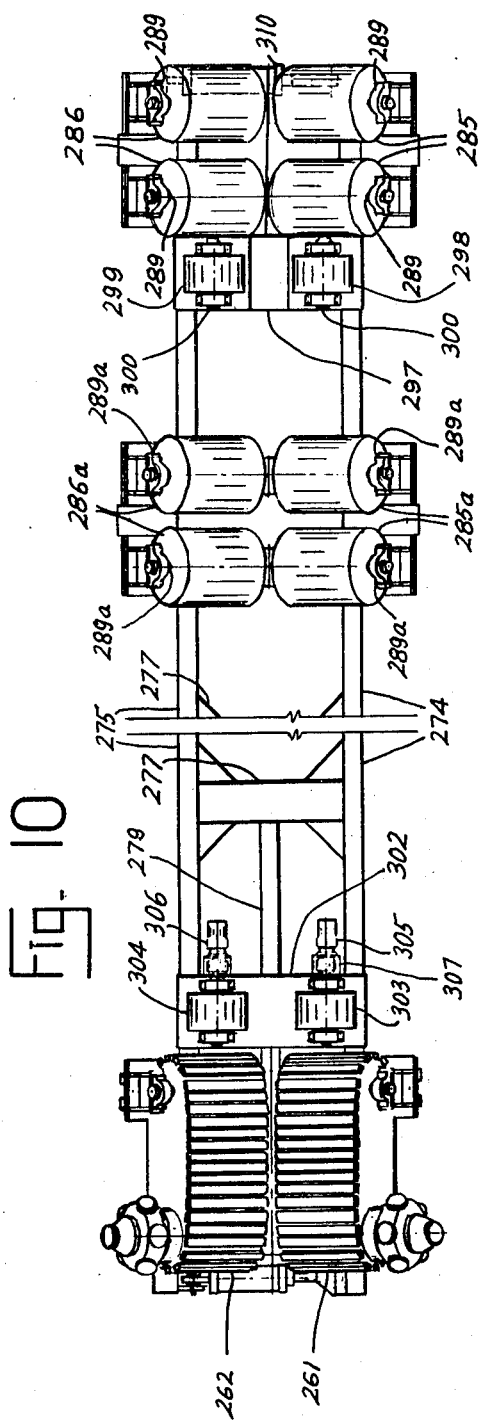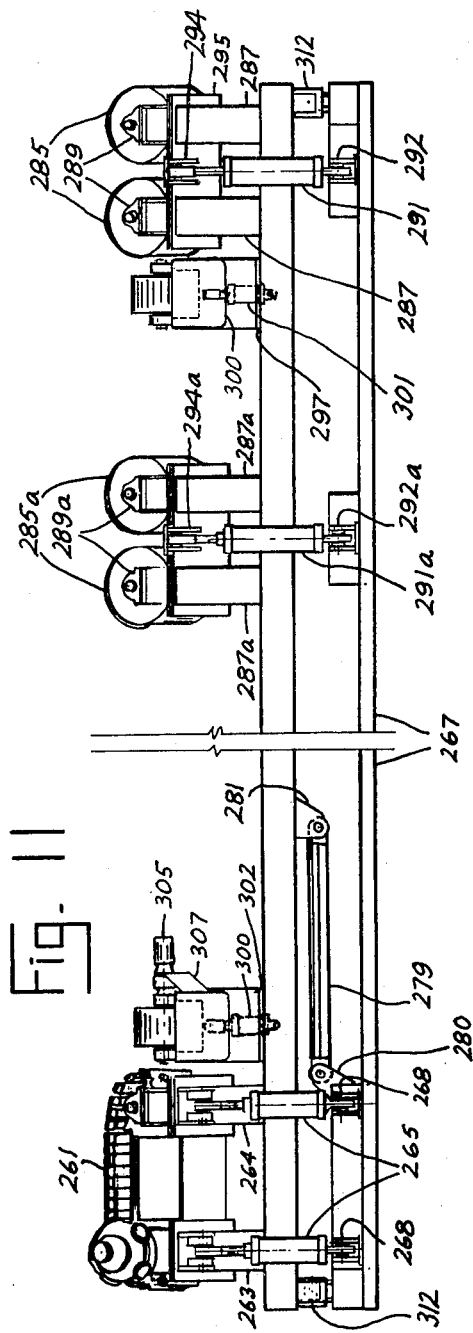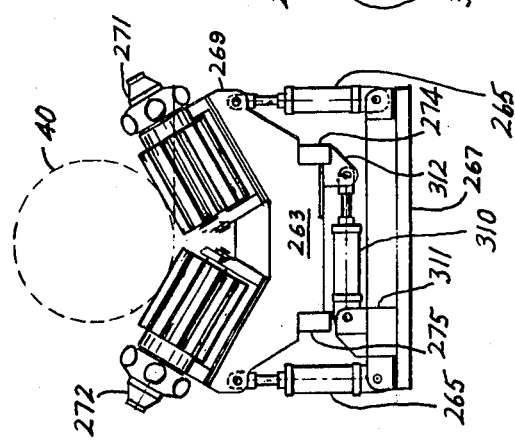

PIPE HANDLING APPARATUS FOR PIPE LAYING BARGES

This application is a division of application Ser. No. 592,170, filed by the same applicant on July 1, 1975 and bearing the same title, which is now U.S. Pat. No. 3,984,007, issued Oct. 5, 1976.

BACKGROUND OF THE INVENTION

In conventional pipe handling apparatus of the type to which this invention pertains, the pipe is moved laterally of its length through some portions of the system by rolling the pipe down inclined supports and by moving the pipe transversely by dragging it with powered lug chains. These methods for pipe transfer invariably result in impact and shock to the outer pipe surface, which in the case of coated pipe can cause serious damage to the pipe coating. This invention avoids such pipe coating damage in the handling of the pipe.

SUMMARY OF THE INVENTION

The invention provides pipe handling apparatus for pipe laying barges, sometimes referred to as lay barges. The pipe is conveyed to the apparatus which aligns the pipe for end-to-end welding on a roller conveyor which moves the pipe longitudinally. The pipe is moved transversely from the incoming pipe conveyor by hydraulically driven pivotal lifters which lift the pipe from the incoming pipe conveyor and deposit it upon a rack. The rack has plural lateral pipe positions, and other hydraulically powered lifters lift the pipe along the rack toward the pipe alignment section of the apparatus, called the line-up conveyors or the line-up section. Incoming pipe conveyors and racks may be provided at each side of the line-up conveyors. A third hydraulically powered lifter is employed to lift the pipe from racks at one or both sides of the line-up conveyors onto the line-up conveyor. The line-up conveyors, two usually being employed, are universally positionable whereby the pipe may be put into proper alignment for welding to a forward section of the pipeline very accurately, and with the pipe completely supported on all of the line-up conveyor rollers at all times. The pipe is not rolled, dragged or dropped during these transfers.

A principal object of the invention is to provide pipe handling apparatus for pipe laying barges in which the pipe is not rolled or dragged during pipe movement. A further object of the invention is to provide such pipe handling apparatus wherein the pipe is lifted and transported and deposited by hydraulically powered lifting means. A further object of the invention is to provide such pipe handling apparatus which may accommodate different sizes of pipe. Still another object of the invention is to provide such pipe handling apparatus wherein the pipe may be moved transversely along the rack supports in single or plural steps. Yet another object of the invention is to provide a line-up conveyor which is universally positionable. A further object of the invention is to provide tandem or multiple line-up conveyors which may be operated in unison.

Other objects and advantages of the invention will appear from the following detailed description of preferred embodiments, reference being made to the accompanying drawings.

BRIEF DESCRIPTIONS OF THE DRAWINGS

FIG. 3 is a partial elevation showing the rack apparatus and the lifter employed to advance pipe along the rack.

FIG. 4 is a partial elevation showing a lifter used for lifting pipe from the rack apparatus to the line-up conveyor. FIGS. 5–7 are respectively a plan view, a side elevation, and an end elevation of the line-up conveyor.

FIGS. 8 and 9 are respectively a plan view and a side elevation of a modified form of rack apparatus according to the invention.

FIGS. 10–12 are respectively a plan view, a side elevation and an end elevation of a modified form of line-up conveyor according to the invention.

DESCRIPTION OF THE PREFERRED EMBODIMENTS

Figure 1:
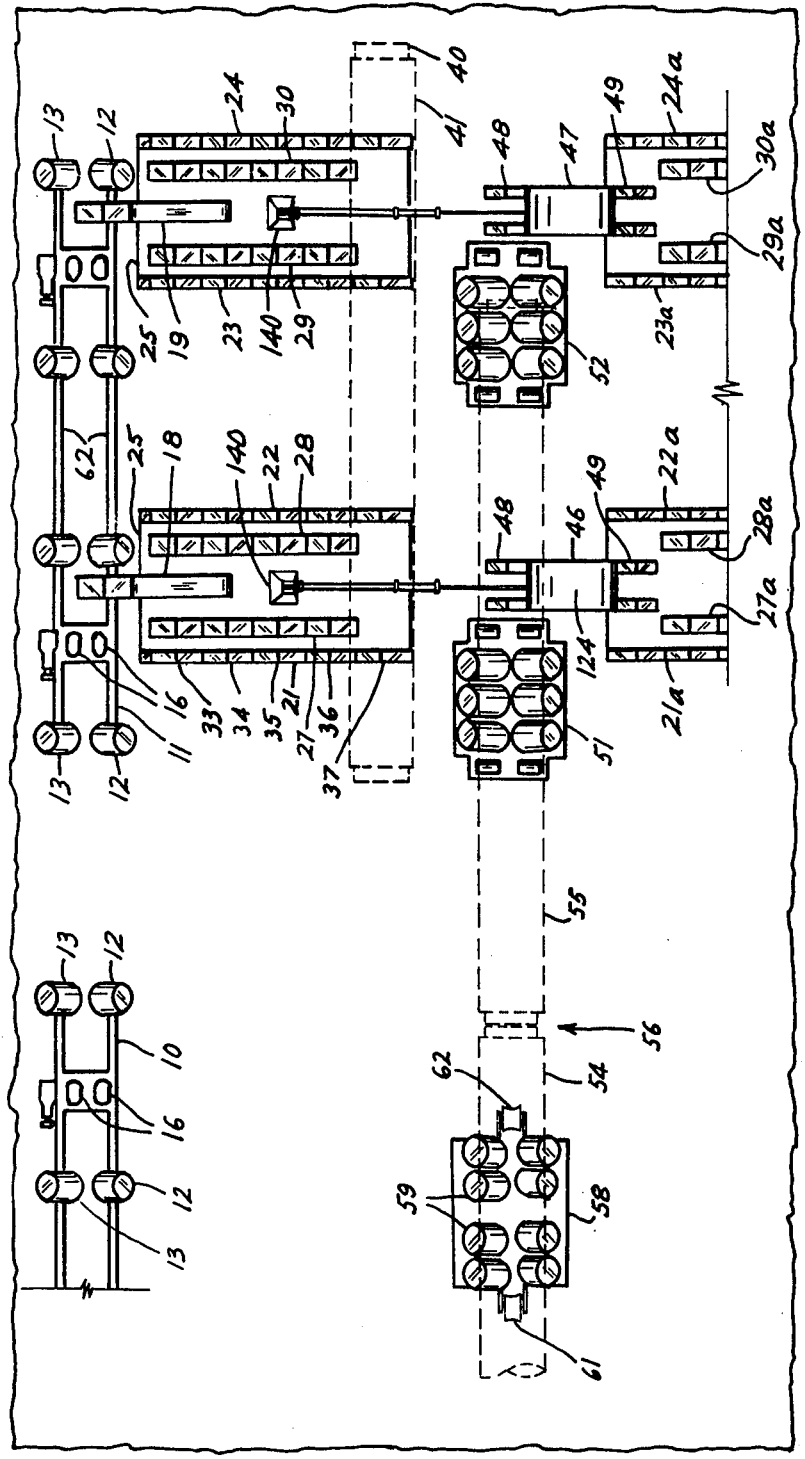
FIG. 1 is a schematic plan view of a preferred embodiment of the apparatus.

Describing the preferred embodiment of apparatus according to the invention which is shown in the drawings, and referring first to FIG. 1 of the drawings, the incoming lengths or sections of pipe are brought in from the stock of pipe aboard the barge by series roller conveyors 10, 11, the pipe travel being stopped as a section of the pipe becomes fully disposed upon conveyor 11. The conveyors 10, 11 which will usually be the last two of a string of such conveyors each have plural pairs of angular rollers 12, 13, the pipe being nested in the angle between the rollers. Spaced pairs of powered rollers 16 are provided as shown for moving the pipe along the angular rollers, which are idle rollers and are not powered. The rollers are coated with a material which will not mar the pipe surfaces.

Each successive pipe section is moved from conveyor 11 by lifters 18, 19 onto racks 21–24, the pipe sections spanning all of the racks as indicated by pipe 40. Lifter 18 is disposed between racks 21, 22 and lifter 19 is disposed between racks 23, 24, each pair of racks forming a rack assembly carried on a base 25. Lifters 27, 28 are disposed parallely adjacent racks 21, 22, and lifters 29, 30 are disposed parallely adjacent racks 23, 24, as shown. Each rack has a plurality of shallow V-shaped pipe rests 33–37, to any of which a pipe section may be moved. Lifters 27–30, lift the pipe along the racks from one pipe rest to a subsequent pipe rest adjacent to or spaced from the original pipe position.

A length or section of pipe 40 is shown on rests 37 of the racks in FIG. 1. The pipe is covered by a layer or coating 41 of concrete or other material. Pipe for underwater use is most commonly coated with concrete having wire imbedded therein for reinforcing, the pipe ends being exposed as indicated in FIG. 1. The exposed ends are provided in order that the pipe lengths may be welded together end-to-end. The exposed pipe surface at the welded joints is covered by a mastic sealing material, commonly a mixture of asphalt and sand, or the like.

Lifters 46, 47, having shallow V-shaped pipe rests 48, 49 at their ends are used for lifting the pipe from the racks 27–30 to the line-up conveyors 51, 52. The line-up conveyors serve to line up the pipe for welding to the end of the pipe line and to support the pipe during welding.

In FIG. 1, pipe section 54 has already been welded at its lefthand end to the end of the pipeline to be laid underwater, and pipe 55 is supported upon the line-up conveyors 51, 52 in aligned abutment with pipe section 54. The abutment between pipe sections 54, 55 is located at the line-up station 56. At this station, the pipes are lined up in flush aligned abutment and are welded together to join the last pipe section to the end of the pipeline. Roller conveyor 58 is the first of a series of conveyors that take the welded-together pipes to different stations down the line for further treatment. Roller conveyor 58 is provided with plural rollers 59 which are idler rollers supporting the pipe in its travel and is also provided with terminal powered rollers 60, 61 to provide longitudinal movement of the pipe.

As shown in FIG. 1, there may also be provided a second set of racks 21a–21b which are provided with pipe lifters 27a–30a and the remainder of the assembly shown at the top portion of FIG. I for conveying pipe to the apparatus and for lifting the same onto the rack assemblies. The lifters 46, 47 are adapted to lift pipe from the racks at both sides for disposition upon the line-up station.

Figure 2:
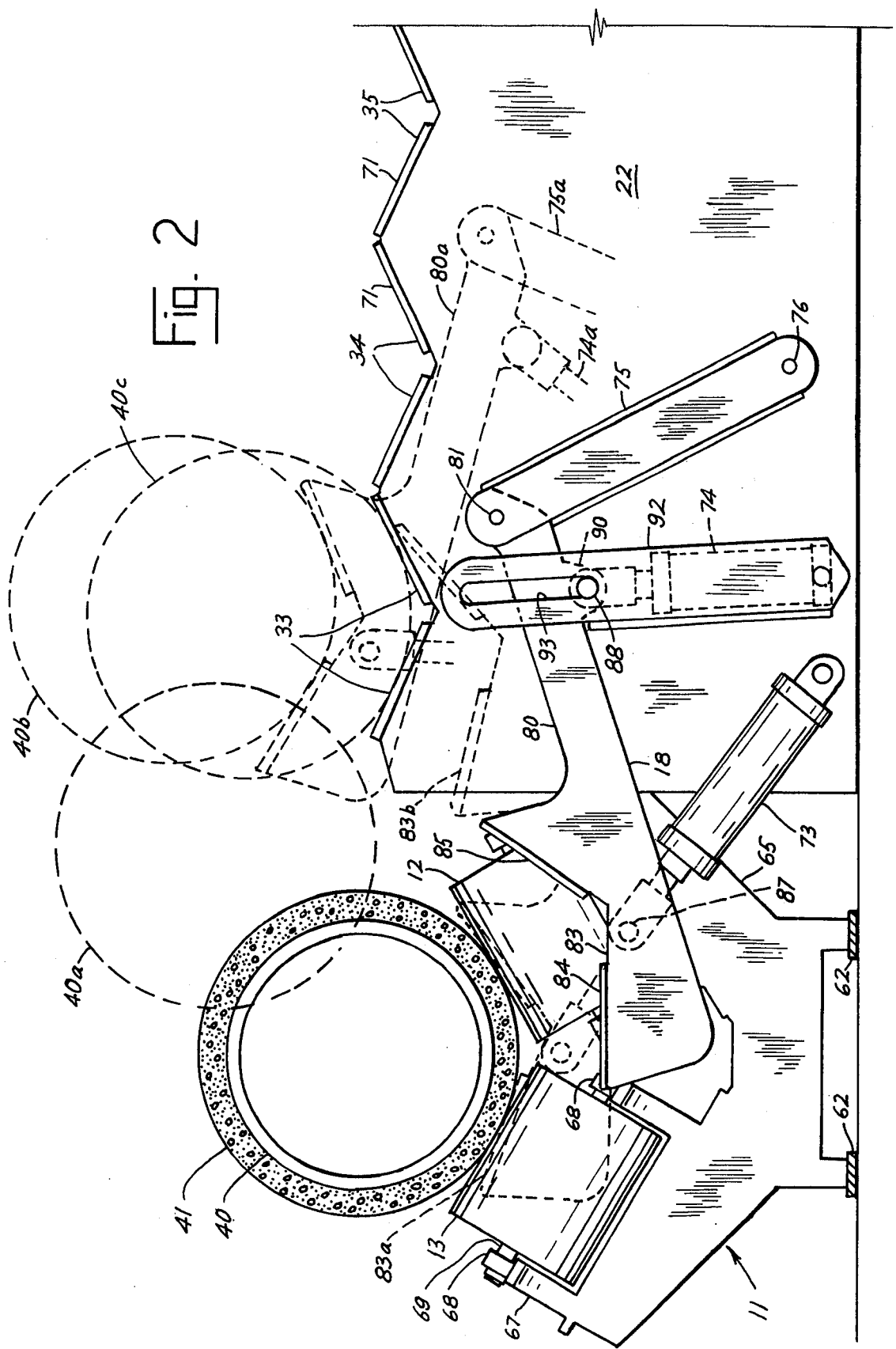
FIG. 2 is a partial end elevation of the apparatus showing a lifter used for lifting pipe from the incoming pipe conveyor to the rack.

Referring now also to FIG. 2 of the drawings, the conveyor 11 has rollers 12, 13 and supports a pipe 40 which is coated with a layer of concrete 41. Conveyor 11 is made up of a plurality of longitudinally spaced stands 65 each of which supports a pair of rollers 12, 13. The stands are aligned along longitudinal connection elements 62. Inner and outer bracket formations 66, 67 each support bearing units 68 in which the roller shafts 69 are journaled, at each side of the conveyor. The conveyor 11 as such does not form part of the invention and all details thereof are not shown and described. Any suitable conveyor for bringing the pipes one by one to the end of racks 21–24 may be used.

The racks 21–24, only rack 22 being shown and the others being identical, may be of any suitable structure all details of which are not shown in FIG. 2. The racks may be made of a vertical steel plate having shallow V-shaped notches along its upper edge to form the pipe rests 33–35. The notches are lined with at least somewhat elastomeric nonabrasive strips 71 to cushion the coated pipes placed thereon.

Hydraulic cylinders 73, 74 are pivotally connected at their lower ends to the base of rack 22. Arm 75 is pivotally connected to the base of rack 22 at 76, the upper end of arm 75 being pivotally connected to lift arm 80 at 81. The lift arm has a pipe rest 83 lined with pads 84, 85. The upper end of hydraulic cylinder 73 is pivotally connected to the pipe rest formation 83 just below and to the left of its center, at pivot pin 87. The upper end of hydraulic cylinder 74 is pivotally connected at pin 88 to downwardly extending bracket formation 90 of lift arm 80. Hydraulic cylinder 74 is equipped with a longitudinal stabilizer 92 which is pivotally connected with the hydraulic cylinder at its lower end and has upper slot 93 along which pivot pin 88 slides when the cylinder is extended and retracted. The stabilizer 92 maintains cylinder 74 in straight longitudinal condition, especially when the cylinder is fully extended. Cylinders 73 and 74, acting together, control the movements of lift arm 80. Extension of cylinder 74 when cylinder 73 is retracted causes movement of arm 75 pivotally toward the right as shown by dashed line positions 74a, 75a, 80a in FIG. 2, and moves the rest 83 from a leftward toward a more rightward position. By actuation of cylinders 73, 74 the rest 83 may be moved to position 83a beneath pipe 40 on conveyor 11 and may then lift the pipe through positions 40a and 40b to a position 40c in which the pipe is supported upon rests 33 of racks 21–24. The rest 83 may then be moved downwardly to position 83b and then through positions 83 and 83a to pick up another pipe from conveyor 11.

It will be noted that pipe 40 is not rolled, dragged or dropped during this conveying movement of the lifter. The pipe is relatively gently contacted by the lifter at its underside while on conveyor 11 and is then lifted smoothly and cleanly through the air to be placed upon rests 33 of racks 21–24. In this manner, the concrete coating 41 (or other coating on the pipe) is not broken or disrupted and remains in usable condition.

In FIG. 3 of the drawings the rack 22 is shown, together with lifter 28 which is used to move pipe sections along rack 22 from one pipe position to another, that is, from one pipe rest to another. It should be noted that lift conveyor 18 is not shown in FIG. 3 while lift 28 conveyor is not shown in FIG. 2, in order to avoid confusing overlapping of parts in the drawings.

Lifter or conveyor 28 is in the form of a longitudinal horizontal rack 101 having plural shallow V-shaped pipe seats or rests 96–99 cushioned or padded by pads 71. Rack 101 has downwardly projecting portions 103, 104 for connection of hydraulic cylinder elements 106, 110 thereto. Hydraulic cylinder 106 is pivotally connected to the base of rack 22 at pivot pin 107, and it upper end is pivotally connected by pin 108 to the left hand portion of rack portion 103. Cylinder 106 is provided with a longitudinal stabilizer 92, as heretofore described in connection with FIG. 2. Hydraulic cylinder 110 is pivotally connected to the base of rack 22 at pin 111 and is pivotally connected at its upper end by pin 112 to rack portion 104. Hydraulic cylinder 110 is also provided with a longitudinal stabilizer 92. Transverse hydraulic cylinder 114 is connected by pin 115 to the upper end of a support standard 116. The opposite end of cylinder 14 is pivotally connected at pin 118 to the lower right hand portion of rack portion 103. Cylinder 114 moves rack 101 and cylinders 106 and 110 through right and left pivotal motions.

Cylinders 106, 110 cause elevation or lowering of rack 101. Therefore rack 101 and rests 96–99 may be moved to engage and move any pipe at rest upon rack 22. Through the use of this lifter, a pipe 40 may be moved from rest 33 to rest 34 or to rest 35, and from any of these positions the pipe may be moved further along the rack to positions 36 and 37. Plural pipes 40 may be moved simultaneously by lifter 28. For example, a pipe 40 in rest 33 and another pipe 40 in rest 35 may be moved simultaneously to rests 34 and 36 or to rests 35 and 37. It should be noted that with large diameter pipes, the pipe will overhang an adjacent rest space, so that pipes may be placed on the rack only at rest positions having an empty rest position therebetween.

In FIG. 4 of the drawings, the right hand end of rack 22 is shown and the left hand end of opposite rack 22 is shown. It will be understood that racks 21–24 and racks 21a–24a function together over the length of the pipes placed thereon. Plate 122 has shallow V-shaped pipe rests 48 and 49 at its opposite ends. The complete lifter consists of two plates 122, parallely spaced, which are joined by a curved connection plate 124, shown in FIG. 1. A pair of hydraulic cylinders 126, 127 are provided at each side of the apparatus, for each plate 122. The lower ends of hydraulic cylinders 126, 127 are pivotally connected at pins 128, 129 respectively, to a base 133. The upper shaft ends of cylinders 126, 127 are each connected to one of the two plates 122 by pins 135, 136, respectively. These are connected to the plates 122 slightly inward of the lower corners thereof. Each cylinder 126, 127 is equipped with a longitudinal stabilizer 92.

A hydraulic cylinder 138 is pivotally connected at its shaft end to the underside of curved cross plate 124 by pin 139. The opposite end of cylinder 138 is connected to a support 140 (see FIG. 1). The hydraulic cylinders 126, 127, acting together, raise and lower the plates 122. The hydraulic cylinder 138 moves the lifter unit horizontally to and fro.

Because of the relatively long span of horizonal movement and the resultant tilt of the plates 122, the rests 48 and 49 are augmented by thickened pads 142 at their inner sides. These prevent the pipe from rolling off inwardly of the rests when the lifting assembly is in an angular position.

In the solid line positions of plates 122 as shown in FIG. 4, the right hand rest 49 is in a position to lift a pipe 40 from rest 37 of rack 22a. Cylinder 138 is extended to move rest 49 to this extreme right hand position. Next, cylinders 126, 127 are extended to lift the pipe, and cylinder 138 is then retracted to bring the pipe to a position over rollers 151, 152 of line-up conveyor 51.

Certain elements at the near end of line-up conveyor 51 are omitted from FIG. 4 in order to avoid confusion in the drawing.

The pipe 40 on rest 37 of rack 22 may similarly be lifted to be moved to the line-up conveyor. In this case, the opposite rest 48 is used to pick up the pipe from rest 37, the cylinders 126, 127 and 138 being appropriately extended or retracted for the movement of the pipe to the line-up conveyor. Various positions to which the hydraulic cylinders and plates 122 may be moved are indicated by reference numerals having alphabetical surfixes.

Figure 7:
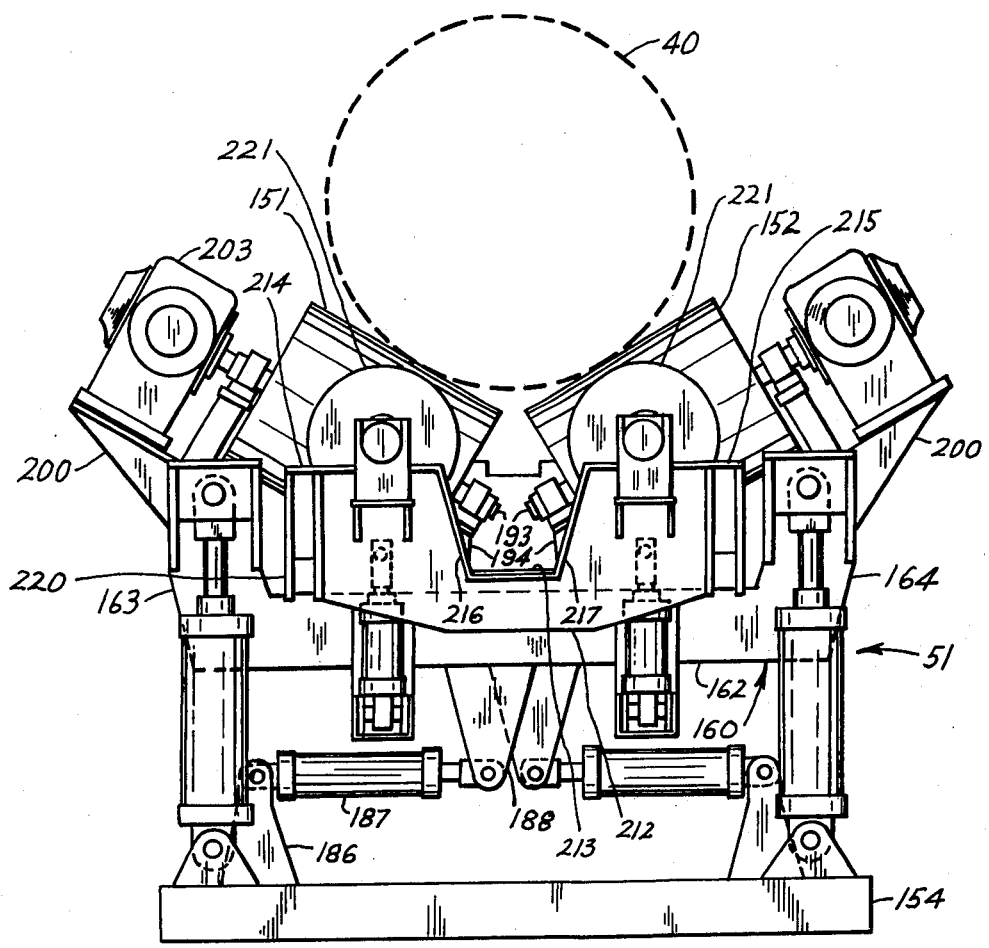

The line-up conveyor 51, FIGS. 5-7, is mounted upon a base 154, which is also shown behind base 133 in FIG. 4. The apparatus has a frame or carriage 160 which is formed by end walls 162 at each end each having at its ends upstanding portions 163, 164, and being of box formation at its remaining parts. The frame has two vertical openings 163, 164 therethrough. Four corner brackets 166-169 are welded to the upstanding end portions 163, 164 of the frame ends and the upper shaft ends of hydraulic cylinders 171-174 are pivotally connected thereto by identical connection pins 175. The lower ends of cylinders 171-174 are pivotally connected by pins 177 to brackets 178 at the four corners of base 154. The pins 175 and 177 are parallel, so that the frame 160 may be moved transversely of the length of a pipe supported by the line-up conveyor.

Referring now particularly to FIG. 6 of the drawings, a stabilizer bar 180 is provided which extends from support bracket 181 on base 154 to bracket 182 at the underside of frame 160. The stabilizer 180 permits up and down movements of the frame, but restrains the frame from movements in endwise directions longitudinally of the pipe carried by the line-up conveyor. The up and down movements of the frame corners are of course controlled by the cylinders 171-174, previously described. With this arrangement, the frame may be placed in a tilted position in any direction of tilt.

A support bracket 186 affixed to base 154 has hydraulic cylinder 187 pivotally connected thereto, the other end of hydraulic cylinder 187 being pivotally connected to bracket 188 depending downwardly from the center of the underside of frame 160. There is a bracket 186, cylinder 187, and bracket 188 at each end of the carriage 160. Action of these two hydraulic cylinders 187 may be used to orient the housing in the direction of the pipe.

As should by now be understood, the carriage or frame 160 is universally positionable as to tilt in any direction and as to elevation above base 154. There are of course two or more line-up conveyors 51 provided in the system, and the two or more of such conveyors may be controlled to act in concert to support and adjust the position of a length of pipe. With proper controls, each carriage may be kept constantly aligned with the length of pipe so that all of its rollers will be in substantial contact with the pipe.

Along each side of carriage 160 there are three upstanding bearing supports 191 which are angled inwardly at their upper portions 192. A bearing assembly 193 is mounted at the top of each support 191. Three bearing supports 194 are provided along each side of central frame portion 195. Each of these has a bearing assembly 193 mounted at its upper end. The supports 194 are angled to be parallel with upper portions 192 of supports 191. The rollers 151, 152 are rotatably mounted between each inner and outer pair of bearings 193. A support 200 affixed angularly to the outer sides of two of the supports 191 carries a hydraulic motor 201 which drives the end roller through gear box 203. Any or all of rollers 151, 152 may be driven as desired. One of the hydraulic motor 201 and gear box 203 assemblies is omitted from FIG. 5, both being shown in FIG. 7, these being in mirror image arrangement one to the other.

At each end of the housing 160 there are two outwardly and downwardly extending brackets 208, equally spaced from the center of the end of the frame. To the outer end of each of these is connected pivotally an upright hydraulic cylinder 210. The two hydraulic cylinders 210 at each end of the frame are each pivotally connected at their upper ends to a platform 212. Each platform 212 has a lower central portion 213 connectd to the more elevated portions 214, 215 by the angular plates 216, 217. Plates 216, 217 have rectangular cut outs 219 providing space for rotation of rollers 221. The rollers 221 are rotatably supported by the bearing assemblies 222, 223. A bracket 225 is provided to support each of the hydraulic motors 227 which drive the rollers 221. The rollers 221 are provided in order to rotate a pipe supported on the conveyor. The hydraulic cylinders 210 are extended to elevate the platforms 212, thereby bringing the roller 221 which are normally below the level of the pipe into contact with the pipe so that it may be rotated. All of the hydraulic cylinders 210 are activated at the same time for this purpose, but may be if desired elevated to different degrees depending on the exact position of the pipe on rollers 151, 152. The platforms 212 are lowered again to bring rollers 221 out of contact with the pipe after the pipe has been rotated to the desired position.

Referring now to FIGS. 8 and 9 of the drawings, there is shown a modified form of rack apparatus for use with the invention. A base 230 has secured thereto a plurality of vertically extending supports 231, 232 across the upper ends of which is supported a rack beam 233. Rack beam 233 has a series of equally spaced notches 234 along its upper edge, each notch 234 having a pair of pipe pads 235 secured thereto, one at each angular side of each notch. The notches are spaced far enough apart that pipes may be placed in adjacent notches. At least two of the described assemblies are provided, in spaced parallel relation, and the pipes 40 are supported across the pair of rack assemblies.

A pipe lifter beam 237 is supported by a plurality of hydraulic cylinders 238. Each hydraulic cylinder 238 is secured at its lower end to a bracket mounted on base 230 and its upper end is secured to the pipe lifter beam 237 as shown. Two pairs of guide plates 240 each supported by a pair of posts 241 secured to base 230 are provided at each side of pipe lifter beam 237 to maintain it parallel to beam 233. A pair of hydraulic cylinders 243 each has one end secured to a bracket 244 mounted on base 230 and its other end connected to a downwardly depending bracket 246 carried by pipe lifter beam 237. Beam 237 has equally spaced notches 244 having pads 245, for support of a pipe at each notch.

Extension of hydraulic cylinders 238 elevates pipe lifter beam 237 so that its pipe engaging pads 245 come into contact with the pipes supported by the rack beam. When pads 245 have engaged the lower sides of the pipes, no further extension of hydraulic cylinders 238 is necessary. The pipes are moved by extending hydraulic cylinders 243 to move the pipes arcuately from one notch 234 to the next adjacent notch 234. Cylinders 238 do not lift the pipes by hydraulic actuation of cylinders 138, but instead the pipes are moved by arcuate movement of the hydraulic cylinders 238 about their connections to bars 230 so that minimal energy is consumed in moving the pipes along the rack. During pipe movements, the hydraulic cylinders 238 act as pivotal stifflegs, while the pipe lifter beam 237 is moved arcuately by pivotal movements of the stifflegs by the two hydraulic cylinders 243. This form of rack assembly has an advantage over that shown in FIGS. 2 and 3, since it requires much less power for its operation.

Two spin rollers 247, 248 driven by hydraulic motors 249, 250, respectively, are mounted on a base 253 adjacent the terminal notch 235 of rack beam 233. These rollers are normally disposed below pipe 40 supported at the terminal notch 235, but may be raised by extension of hydraulic cylinders 254, 255 to engage and lift the pipe, following which the pipe may be rotated by operation of motors 249, 250 to change the rotational position of the pipe. After the pipe has been properly rotated, cylinders 254, 255 are retracted to lower the pipe into notch 235.

In FIGS. 10–12 there is shown a modified form of line-up conveyor. The line-up conveyor shown in FIGS. 10–12 may be employed to replace two or more of the line-up conveyors of the form shown in FIGS. 5–7. A pair of angularly disposed slat conveyors 261, 262 are carried by a pair of frames 263, 264 supported by two pairs of hydraulic cylinders 265. A base 267 supports a pair of channels 268 disposed crosswise of the base, and the lower ends of hydraulic cylinders 265 are connected to the channels by pins as shown. The channels are reinforced by vertical plates 268a, 268b. The upper ends of hydraulic cylinders 265 are connected to bracket formations 269, one at each end of each frame 263, 264. The slat conveyors are driven by reversible hydraulic motors 271, 272 when it is desired to move a pipe 40 mounted on the slat conveyors longitudinally in either direction.

A pair of longitudinal beams 274, 275 are connected to the lower sides of frames 263, 264, and extend beyond frame 264 to the opposite end of the apparatus. Plural spaced frame elements 277 maintain the beams 274, 275 in parallel relation.

A bar 279 is pivotally connected at one end to bracket 280 supported on base 267. The other end of bar 279 is connected to bracket 281 carried beneath one of the brace elements 277, as shown. Bar 279 restrains the frame formed by beams 274, 275 and the cross brace elements 277 against longitudinal movements, but permits it to be raised and lowered.

Two pairs of oppositely disposed and oppositely inclined idler rollers 285, 286 are supported by angular supports 287 mounted across beams 274, 275. The rollers 285, 286 are journaled in bearings 289 disposed at the inner and outer ends of each roller. Two hydraulic cylinders 291, one at each side of the apparatus, are pivotally connected to a cross channel 292 supported by base 267 at their lower ends, and are pivotally connected to brackets 294 at their upper ends, brackets 294 being secured to the outer edge of a plate 295 disposed across the supports 287 at each side of the apparatus. Operation of hydraulic cylinders 291 elevates or lowers the rollers 285 or 286. A second roller assembly is disposed across beams 274, 275 spaced from the first described assembly. This assembly is exactly the same as that described at the right hand end of FIGS. 10–11, and is referred to by the same reference numerals, each reference numeral bearing the suffix "a".

A plate 297 across beams 274, 275 supports a pair of rollers 298, 299. Each of these rollers is supported by a bracket 300 supported by a hydraulic cylinder 301 supported by plate 297. Rollers 298, 299 are idler rollers which may be elevated to support the pipe when it is to be rolled to adjust its rotational position. A plate 302 disposed across beams 274, 275 similarly supports a pair of rollers 303, 304. Rollers 303, 304 are powered spin rollers which may be operated to cause rotation of the pipe when it is desired to adjust its rotational position. A pair of reversible hydraulic motors 305, 306 each supported by a support 307 cause rotation of rollers 303, 304 to spin roll the pipe in either rotational direction. The idler rollers 298, 299 may be similarly driven if desired or required. When it is desired to adjust the rotational position of a pipe, all of the rollers 298, 299, and 303, 304 are elevated to lift the pipe from the slat conveyors 261, 262 and the idler rollers 285, 286, 285a, 286a, and after the rotational position of the pipe has been adjusted, the rollers 298, 299 and 303, 304 are lowered to replace the pipe upon slat conveyors 261, 262 and idler rollers 285, 286, 285a and 286a.

A transverse hydraulic cylinder 310 is supported at one end of the apparatus by bracket 311 carried by base 267 and is pivotally connected at its other end to bracket 312 mounted at the underside of frame 263. Extension and retraction of cylinder 310 causes transverse movements of frame 263 and of that end of beams 274, 275. An additional cylinder 310a is mounted in the identical manner at the opposite end of the beams 274, 275.

The beams 274, 275 keep all of the rollers 285, 286, 285a, 286a and the slat conveyors 261, 262 in alignment, so that all of these constantly support a pipe resting thereon. Elevation of the pipe may be adjusted by operation of cylinder 265 and 291. The angular position of the pipe may be adjusted by operation of the cylinders 291, 291a and 268. Transverse pipe position is adjusted by operation of cylinders 310, 310a. The apparatus of FIGS. 10–12, therefore, may be substituted for the two or more line-up conveyors of the form shown in FIGS.

5-7, previously described. Control of the apparatus shown in FIGS. 10-12 is somewhat simpler than control of the apparatus of FIGS. 5-7, since no requirement is present for maintenance of the spaced rollers in mutual alignment.

Figure 13:
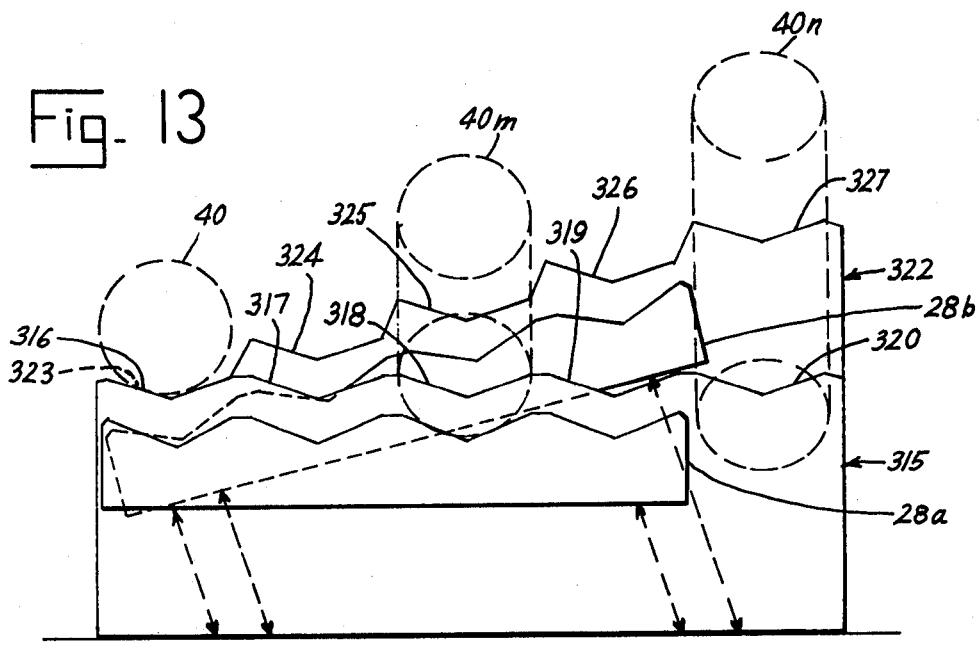
FIGS. 13–14 are, respectively, schematic side and end elevations illustrating a modified form of pipe rack apparatus afforded by the invention.
Figure 14:
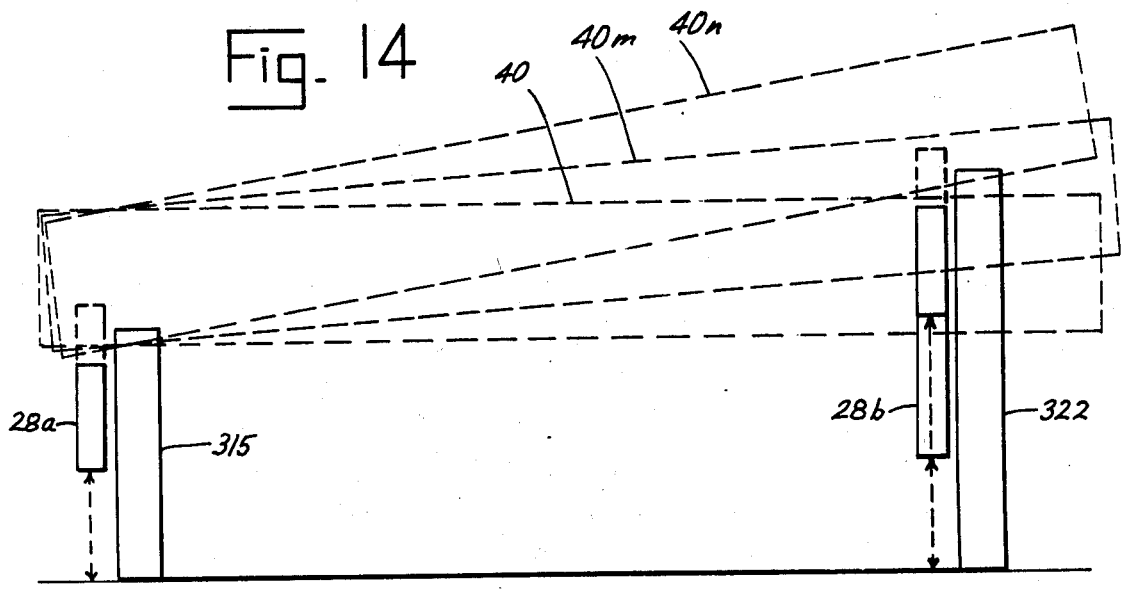

In FIGS. 13-14, a form of pipe rack apparatus is indicated which is useful particularly when a pipeline is laid in very deep water. Pipe lengths are successively handled by the apparatus herein described and welded one by one or in plural length joints to the pipeline extending from the pipe laying barge into the water and to the floor of the body of water. The pipeline usually leaves the barge in a generally horizontal direction, and bends downwardly into the water, being supported for a distance from the barge. The tension of the pipeline extending from the barge is controlled by pipe tensioning apparatus aboard the barge. When the water is very deep, the pipeline leaving the barge must bend substantially 90° downwardly, since the weight of the relatively long length of pipeline reaching from the barge to the water floor is large, and the pipeline assumes a straight downward path toward the water floor. The pipeline makes another substantially 90° bend to its final position horizontally disposed upon the water floor.

The pipe tensioning apparatus aboard the barge maintains a more or less constant tension on the downwardly extending pipe, and this enables control of the lower 90° bend of the pipeline at the water floor. The pipe tensioner, however, cannot control the upper 90° bend of the pipeline adjacent the water surface, and the tension imposed by the pipe tensioning apparatus is exerted through the upper 90° bend, which results in large bending forces being imposed on the pipeline at the upper 90° bend. The situation is improved if the pipeline can be made to leave the barge at a downward angle from horizontal. Ideally, all bending strain on the pipeline could be eliminated if the pipeline were to leave the barge in a straight downward direction, and the larger the downward angle of the pipeline from horizontal the less bending strain on the pipeline for any given type of equipment.

The form of rack apparatus indicated in FIGS. 13-14 affords a substantial downward angle for the lengths of pipe used in fabricating the pipeline. The line-up conveyor and subsequent stations of the pipeline assembly line, including the tensioning apparatus, will be disposed at the same downward angle as the rack apparatus, on a downwardly sloped deck or other support provided on the barge. The conveyors 10 and 11 will still be disposed horizontally.

In FIGS. 13-14, the pipe rack 315 has plural pipe support notches 316-320, disposed at the same level. The pipe rack 322 has plural pipe support notches 323-327 at successively higher levels. The pipe 40 is placed on notch supports 316 and 323 in horizontal position by lifters 18-19 (see FIGS. 1-2). The pipe is advanced from notch supports 316 and 323 to final notch supports 320 and 327 by lifter conveyors 28a, 28b, the latter being angularly disposed parallel with rack 322. In this way, the pipe is inclined in steps from horizontal position 40 to angular position 40n, one intermediate angular position 40m being illustrated. The pipes are successively delivered from position 40n to the line-up conveyor, disposed at the same angle, as hereinabove described. Angular pipe dispositions up to 11° from horizontal have been achieved, and it is believed that angular pipe dispositions of at least 20° from horizontal may be used according to the precepts of this embodiment of the invention.

As stated earlier, the entire system shown in FIGS. 1-12 may be disposed on angularly disposed supports, to achieve the angular pipe disposition, without use of the FIG. 13-14 rack apparatus.

While preferred embodiments of the invention has been described and shown in the drawings, many modifications thereof may be made by a person skilled in the art without departing from the spirit of the invention, and it is intended to protect by Letters Patent all forms of the invention falling within the scope of the following claims.

I claim:

1. Pipe lifter conveyor apparatus, comprising, in combination, a generally horizontally disposed elongate pipe lift beam having an upwardly facing pipe seat means at each end thereof adapted to support a pipe disposed thereon transversely of said pipe lift beam, said pipe lift beam having a pivotal connection adjacent each end thereof, a pair of first drive cylinder means each pivotally connected to one of said pivotal connections of said pipe lift beam at its upper end and each being stationarily pivotally supported beneath said pipe lift beam at its lower end, generally horizontally disposed second drive cylinder means disposed generally parallel to said pipe lift beam and having a pivotal connection to said pipe lift beam at one of its ends and having its other end stationarily pivotally supported, said first drive cylinder means being adapted to independently move said ends of said pipe lift beam in pivotal directions of said first drive cylinder means, said second drive cylinder means being adapted to move said pipe lift beam longitudinally, said first and second drive cylinder means being adapted to cooperatingly move said pipe lift beam to selectively move either one of said pipe seat means between a common central position and extended positions at its end of the apparatus, whereby a pipe may be selectively moved by said apparatus between any of said extended positions at either end of said apparatus and said common central position.

2. The combination of claim 1, including plural said pipe lifter conveyor apparatuses disposed parallely and spacedly side by side.

3. The combination of claim 1, each said drive cylinder means comprising hydraulic cylinder means.

4. The combination of claim 1, each said first drive cylinder means having slot means having said pivotal connection to said lift beam slidably disposed therein to limit extension and retraction thereof.

5. The combination of claim 4, each said drive cylinder means comprising hydraulic cylinder means.

6. The combination of claim 4, including plural said pipe lifter conveyor apparatuses disposed parallely and spacedly side by side.

* * * * *